United States Patent [19]
Skinner

[11] Patent Number: 5,836,593
[45] Date of Patent: Nov. 17, 1998

[54] EQUIPMENT MOVER PAD

[76] Inventor: Vernon James Skinner, 18 Oakhill, Hollesley, Woodbridge, Suffolk, United Kingdom

[21] Appl. No.: 211,556

[22] PCT Filed: Oct. 16, 1992

[86] PCT No.: PCT/GB92/01911

§ 371 Date: May 14, 1996

§ 102(e) Date: May 14, 1996

[87] PCT Pub. No.: WO93/08105

PCT Pub. Date: Apr. 29, 1993

[30]    Foreign Application Priority Data

Oct. 18, 1991 [GB] United Kingdom ............... 9122150

[51] Int. Cl.$^6$ ................................................. B62B 15/00
[52] U.S. Cl. ................................................. 280/19; 280/20
[58] Field of Search ................... 280/19, 1.5, 18, 280/22, 24, 28, 17, 47.4; 5/625, 628

[56] References Cited

U.S. PATENT DOCUMENTS

| | | | |
|---|---|---|---|
| 1,022,308 | 4/1912 | Elkins | 280/19 |
| 1,162,473 | 11/1915 | Gedge | 280/19 |
| 1,196,818 | 9/1916 | Smith | 280/19 |
| 2,308,699 | 1/1943 | Longenecker | 280/19 |
| 2,424,694 | 7/1947 | Jones | 280/19 |
| 2,570,343 | 10/1951 | Hendrickson | 280/19 |
| 3,237,222 | 3/1966 | Frost | 280/19 |
| 3,312,263 | 4/1967 | Wahlstrom | 280/19 |
| 3,378,274 | 4/1968 | Poppen | 280/18 |
| 3,479,046 | 11/1969 | Thompson | 280/18 |
| 3,641,601 | 2/1972 | Sieg | 5/345 |
| 3,938,818 | 2/1976 | Studeny et al. | 280/19 |
| 3,973,281 | 8/1976 | Davis et al. | 5/131 |
| 3,982,748 | 9/1976 | Hooper et al. | 280/19 |
| 4,132,427 | 1/1979 | McGee | 280/19 |
| 4,173,351 | 11/1979 | Hetland | 280/19 |
| 4,506,664 | 3/1985 | Brault | 5/628 |
| 4,566,445 | 1/1986 | Jelsma et al. | 5/628 |
| 4,639,003 | 1/1987 | Potter | 280/24 |
| 4,673,452 | 6/1987 | Awdhan | 156/254 |
| 4,996,818 | 3/1991 | Bettinger | 52/811 |
| 5,150,487 | 9/1992 | Hemphill | 5/625 |
| 5,167,425 | 12/1992 | Chen | 280/648 |
| 5,173,346 | 12/1992 | Middleton | 428/53 |
| 5,271,110 | 12/1993 | Newman | 5/81.1 |
| 5,353,454 | 10/1994 | Callaway et al. | 5/451 |
| 5,425,567 | 6/1995 | Albecker, III | 297/377 |
| 5,639,145 | 6/1997 | Alderman | 297/452.45 |
| 5,653,455 | 8/1997 | Richards | 280/19 |

FOREIGN PATENT DOCUMENTS 261522   5/1949   Switzerland ............................. 280/19

Primary Examiner—Brian L. Johnson
Assistant Examiner—Bridget Avery
Attorney, Agent, or Firm—Dorn, McEachran, Jambor & Keating

[57] ABSTRACT

A device for pulling heavy equipment across a supporting surface such as a floor. It includes a composite pad of generally rectangular shape having lengthwise and crosswise edges. The composite pad includes a lower, flexible sheet of plastic and an upper backing of rubber. The plastic sheet has a smooth lower surface for engaging the floor. The upper rubber backing has a ribbed surface for engaging the equipment. A pair of straps attached to the composite pad extend lengthwise beyond at least one crosswise edge of the composite pad. Each of the pair of straps is attached to the composite pad between the plastic sheet and the rubber backing along a lengthwise edge of the composite pad. Each of the straps terminates in a distal end located remotely of the composite pad and a handle is formed in each distal end of each strap. Each strap may extend beyond each crosswise edge of the pad. An accessory pad of the same size and shape as the composite pad is formed of a synthetic carpet fabric and is intended to be positioned below the smooth lower surface of the plastic sheet of the composite pad to assist in moving the composite pad over a flat vinyl, wooden or rubberized floor.

5 Claims, 4 Drawing Sheets

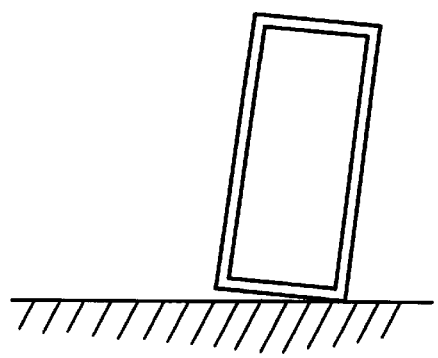
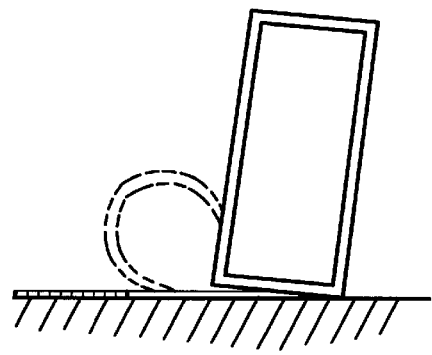
FIG. 5   FIG. 6
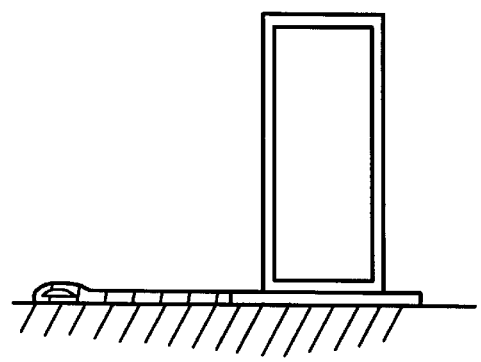
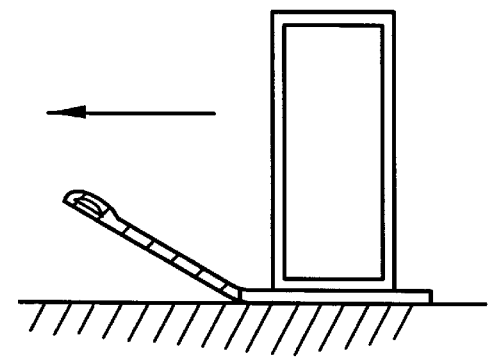
FIG. 7   FIG. 8
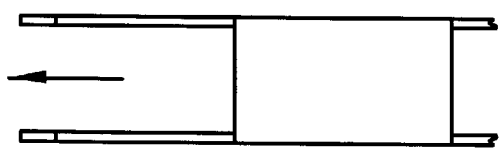
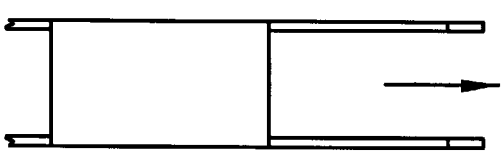
FIG. 9   FIG. 10
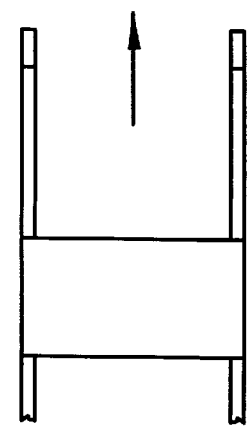
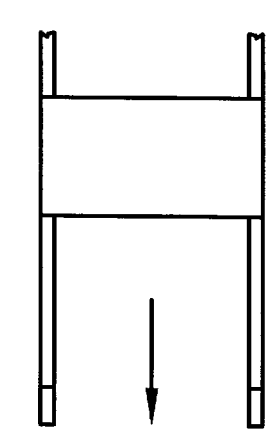
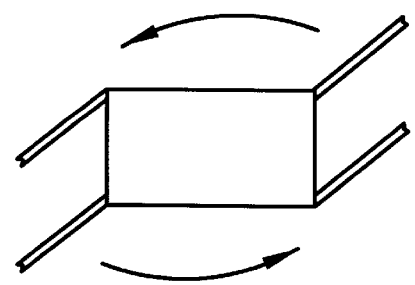
FIG. 11   FIG. 12   FIG. 13

EQUIPMENT MOVER PAD

TECHNICAL FIELD

My invention relates to equipment handling. The mover pad enables heavy items to be moved easily and safely without the need for lifting.

Wheeled trucks, trolleys and kick boards are usually employed to move heavy objects. There may be difficulties and dangers inherent in their use, for example tall and/or bulky objects tend to be unstable and may topple.

When lifting gear is not available, physical strength is required for the process of lifting heavy goods or a person onto a conveyance, and is therefore a potential cause of back and other industrial injuries.

BACKGROUND ART

The prior art, U.S. Pat. No. 650,703, provided a method of handling material which comprised placing a load upon a flat sheet, usually of solid fibre board, with an extension of 4" for pull tabs at the edges. This sheet served as a base for stacking boxes or packages of a uniform rectangular shape.

A lift truck carrying a platen, had a gripper bar to pull the loaded sheet by its tab onto the platen. The load was then transported by the truck to its destination, i.e. the warehouse or the shipper. On its arrival the sheet with its load was pushed by the truck's gripper bar off the platen onto the floor or a stack of other goods.

Unlike the slip sheet, the Pad is very versatile, enabling a person to pull objects of all shapes and sizes along flooring with the Pad's straps and handles. Its ribbed rubber backing enables heavy equipment to be manoeuvred onto it without lifting. Its lower face of smooth, tough commercial vinyl surface allows it to slide over carpets, and its accessory pad enables the Pad which to work on all types of indoor flooring.

DISCLOSURE OF INVENTION

In accordance with the present invention, I provide a completely new concept consisting of a mover pad of tough, smooth reinforced vinyl commercial flooring material with ribbed rubber backing, and having firmly attached nylon straps handles.

This pad is easily inserted underneath the equipment to be moved by tilting the equipment slightly and then returning it to its upright position. With the object sitting squarely on the pad it can then be pulled by the handles and moved smoothly to wherever required.

A specific embodiment of the invention will now be described by way of example with reference to the accompanying drawing in which:

FIG. 5 shows the equipment to be moved tilted slightly;

FIG. 6 shows the mover pad positioned underneath the equipment;

FIG. 7 shows the equipment squarely manoeuvred onto the mover pad;

FIG. 8 illustrates the equipment being pulled along a flat surface safely and easily to its new destination;

FIGS. 9 and 10 show the mover pad being pulled in a lengthways direction;

FIGS. 11 and 12 show the mover pad being pulled in a sideways direction;

FIG. 13 shows the mover pad being rotated to any position required;

Figure 1:
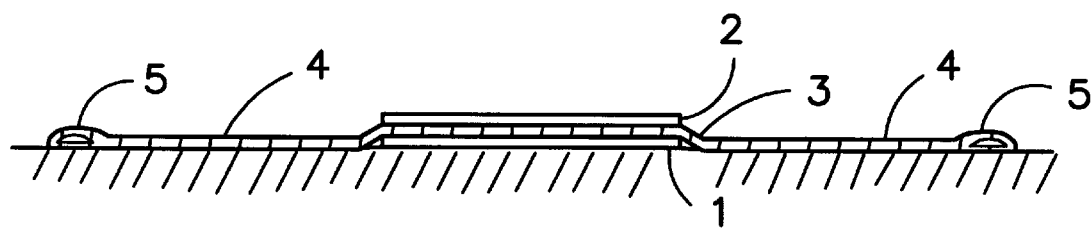
FIG. 1 shows a profile of a mover pad.

Referring to the drawing the mover pad comprises a tough reinforced commercial vinyl flooring material, with a slightly dimpled yet smooth surface 1 and with ribbed rubber 2. The vinyl used is to be resistant to the feet of furniture, equipment, etc, and to have a high scuff resistance. It will be seen that the pad is basically rectangular, and its size is of such dimensions as required for the equipment or goods being transported. Suitable dimensions for general purposes would be 72 cm×106 cm×7 mm thick.

Figure 2:
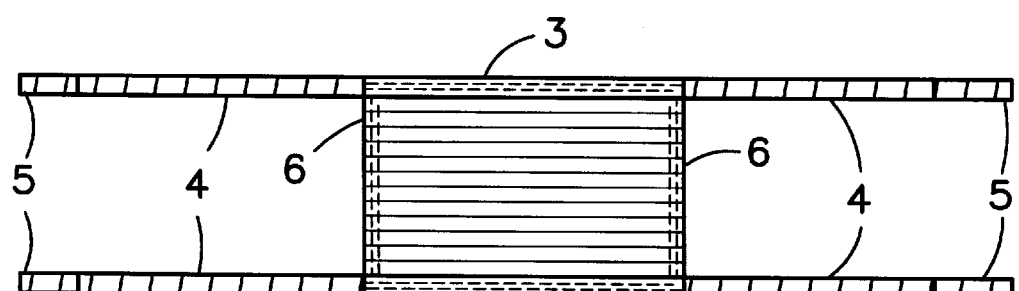
FIG. 2 shows a plan of the mover pad.
Figure 3:
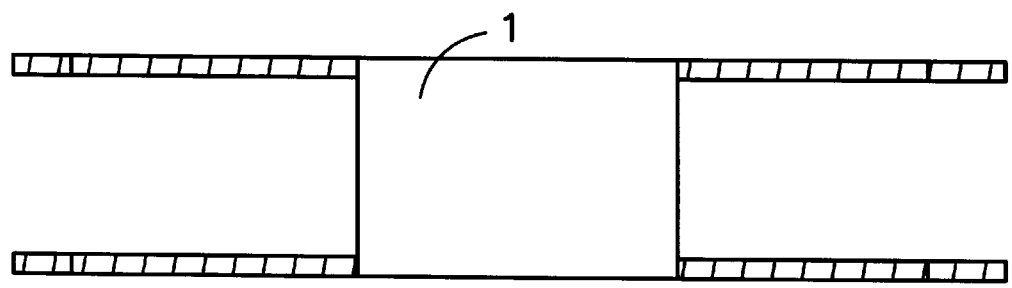
FIG. 3 shows the underneath of the mover pad.

Nylon webbing of 5 cm width is stitched with nylon buttoning twine along the two longer margins of the pad 3, between the vinyl and the ribbed rubber. This webbing is extended from both margins to form straps of approximately 103 cm length 4. Towing handles 5 are stitched at each end of these. Webbing is also stitched between the vinyl and the ribbed rubber to the two shorter margins of the pad 6 as shown in FIG. 1, FIG. 2 and FIG. 3.

The vinyl material of the mover pad has a low enough coefficient of friction to slide smoothly over a flat carpeted floor when moving heavy equipment.

Figure 4:
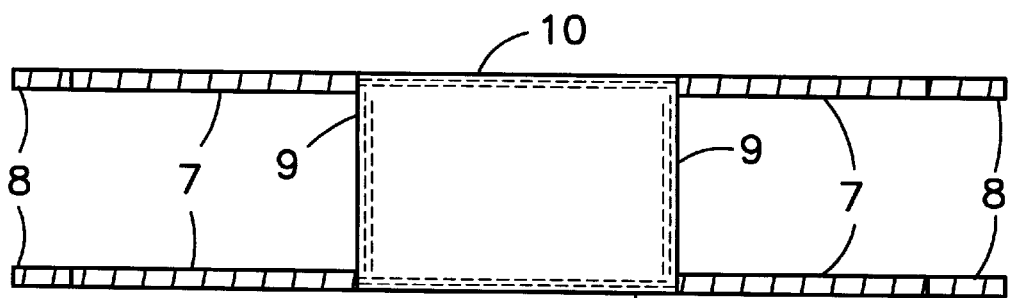
FIG. 4 shows an accessory pad.

To move the mover pad over a flat vinyl, wooden or rubberized floor, an accessory pad consisting of two light polypropylene cord carpet pieces are used as shown in FIG. 4. These are both of the same size, and the same size of the mover pad. They are stitched with nylon buttoning twine back to back, together with nylon webbing of 5 cm width between them along the two longer margins 10.

This webbing is of a different colour to distinguish it from the webbing of the mover pad, and is extended from both margins to form straps of approximately 103 cm length 7. Towing handles 8 are stitched at each end of these. Webbing is also stitched between the two carpet pieces to the two shorter margins of the pad 9. Self-adhesive tape of 5 cm width is used to bind the edges.

Figure 14:
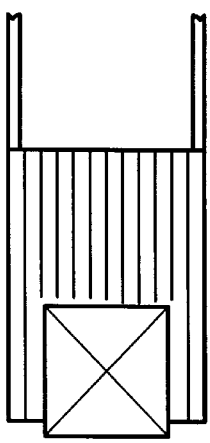
FIG. 14 shows the mover pad positioned underneath the equipment.
Figure 14:
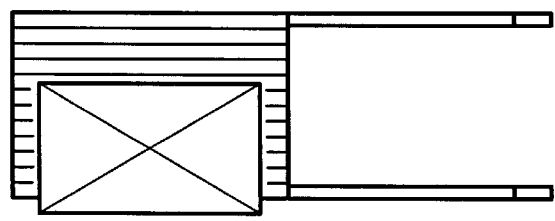
Figure 15:
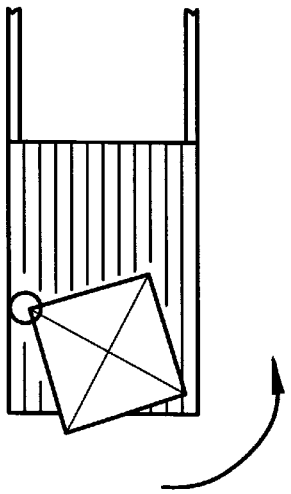
FIG. 15 shows one front corner used as a pivot, while the diagonally opposite corner is swivelled onto the pad.
Figure 15:
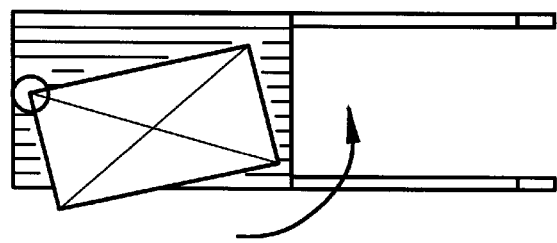
Figure 16:
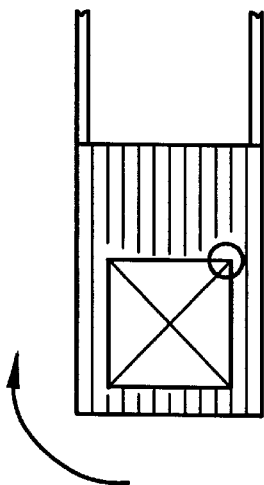
FIG. 16 shows the other front corner used as a pivot, while the diagonally opposite corner is swivelled squarely onto the pad.
Figure 16:
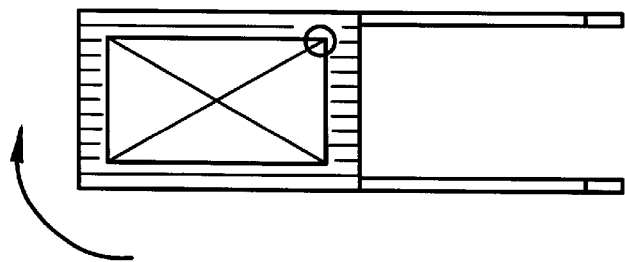

In order to move the equipment, an assistant tilts the equipment slightly as shown in FIG. 5. The pad is then positioned underneath the equipment as shown in FIG. 6 and FIG. 14. With the help of an assistant, the equipment is then manoeuvred squarely onto the mover pad as shown in FIG. 7. This is done by slightly tipping it onto one front corner, and using this corner as a pivot, the diagonally opposite corner is gently swivelled onto the pad as shown in FIG. 15. This procedure is then repeated with the other front corner as shown in FIG. 16.

The equipment can then be pulled along on a flat floor safely and easily, through doorways and round obstacles and corners as shown in FIG. 8. Expensive flooring and door frames are also protected from damage.

With the manoeuvre completed, the pad is easily retrieved by carrying out the process in reverse as shown in FIG. 16, FIG. 15, FIG. 14 and FIG. 6.

The pad may be pulled lengthways in either direction as shown in FIG. 9 and FIG. 10. It may also be pulled sideways in either direction as shown in FIG. 11 and FIG. 12, and rotated to any position required as shown in FIG. 13.

Figure 17:
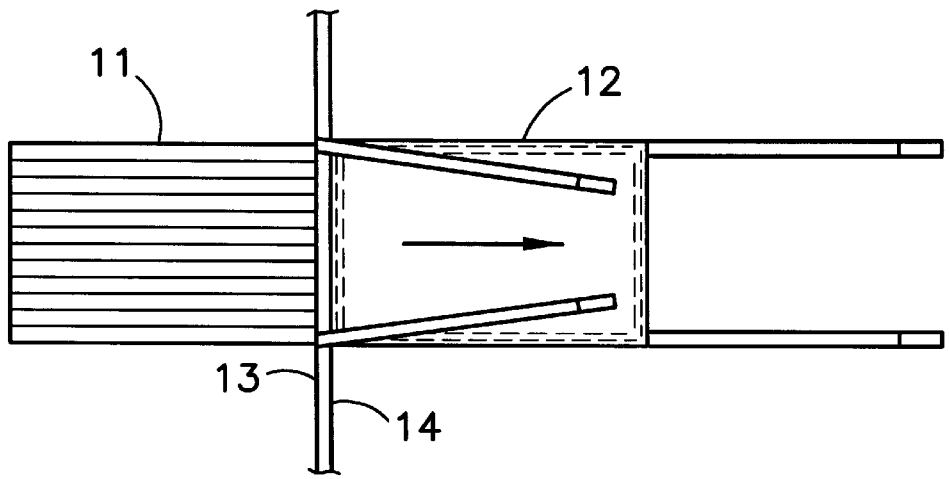
FIG. 17 illustrates the mover pad aligned alongside the accessory pad.
Figure 18:
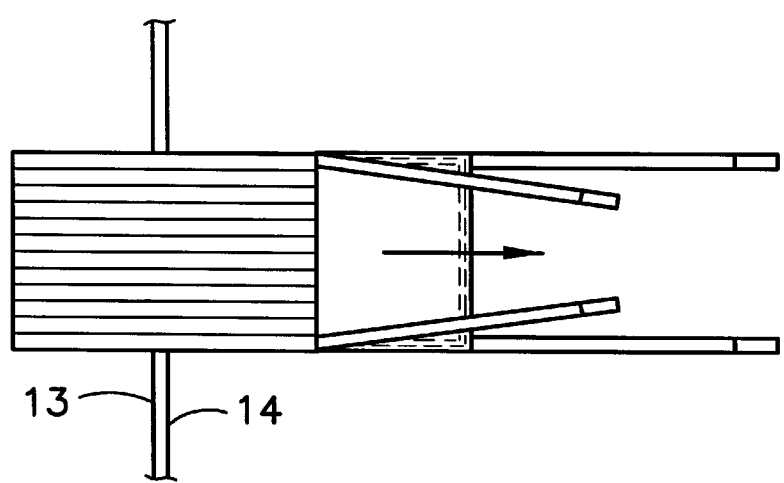
FIG. 18 illustrates the mover pad being pulled onto the accessory pad.
Figure 19:
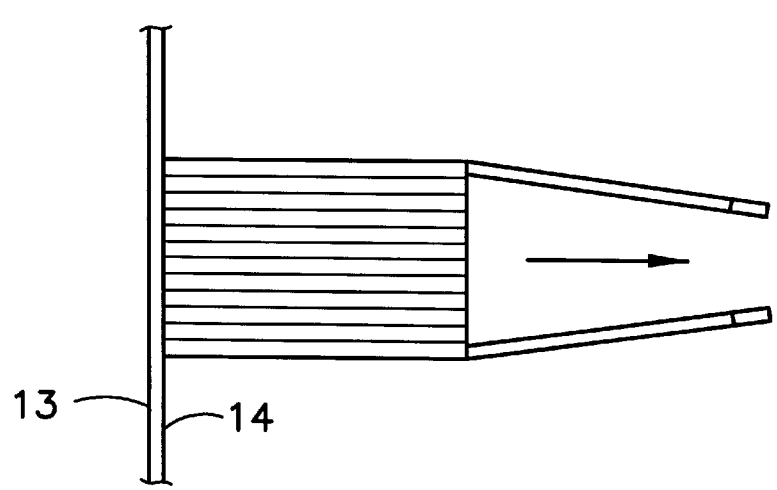
FIG. 19 illustrates the mover pad positioned squarely on the accessory pad.

To manoeuvre the equipment on the mover pad 11 from carpet 13 to uncarpeted flooring 14, the accessory pad 12 is placed on the uncarpeted flooring alongside the carpet edge as shown in FIG. 17. The mover pad is then pulled squarely onto the accessory pad as shown in FIG. 18 and in FIG. 19.

The mover pad handles are then pulled together with the accessory pad handles and then both pads slide easily over the flooring.

To manoeuvre in the reverse sequence, the mover pad and the accessory pad are pulled together alongside the carpet edge. Now by pulling only the mover pad handles, the mover pad is slid off the accessory pad and onto the carpet.

To greatly assist in pulling a weighty object, more horizontal force may be used by straightening the back and leaning backwards slightly, until the limiting frictional force caused by the extra weight is overcome.

Both mover pad and accessory pad are light and portable. They can be rolled up with the straps and handles tucked inside, and they can easily be stored away as shown in FIG. 6.

The market in which the innovation would be used is anywhere where the moving of equipment, furniture, objects, persons or packages is required indoors. This market would be in homes, offices, shops and stores, removal firms, light industry, hospitals and nursing homes, hotels and guest houses all over the world.

The Pad is so straightforward and uncomplicated that there could be no adverse factors to affect the future of its market.

There is a definite market growth capability because the mover pad fills a need for safe and easy indoor moving.

I claim:

1. A device for pulling heavy equipment across a supporting surface comprising:

a composite pad of generally rectangular shape having longitudinally extending and transversely extending edges, said composite pad including a lower, flexible sheet of plastic and an upper backing of rubber, said plastic sheet having a smooth lower surface for engaging said support surface, said rubber backing having a ribbed upper surface for engaging said equipment, said composite pad being coilable into a compact helical configuration about said transversely extending edges, and a pair of straps attached to said composite pad and extending longitudinally beyond at least one transversely extending edge of said composite pad.

2. The device of claim 1 in which each of said pair of straps is attached to said composite pad between said plastic sheet and said rubber backing and along one of said longitudinally extending edges thereof.

3. The device of claim 1 in which each of said straps terminates in a distal end located remotely of said composite pad and a handle is formed in each distal end of each of said straps.

4. The device of claim 1 in which each strap attached to said pad extends longitudinally beyond oppositely located transversely extending edges of said pad with each strap terminating in a distal end located remotely of said pad.

5. The device of claim 1 further including an accessory pad of substantially the same size and shape as said composite pad, said accessory pad being formed of a synthetic carpet fiber, and adapted to be positioned beneath said smooth lower surface of plastic sheet of said composite pad.

\* \* \* \* \*